US007278338B2

(12) United States Patent
Chen

(10) Patent No.: US 7,278,338 B2
(45) Date of Patent: Oct. 9, 2007

(54) CONTROL DEVICE FOR RATCHET WRENCH

(76) Inventor: Terence Chen, No. 325, Yungching Rd., Dungshan Shiang, Ilan (TW)

( * ) Notice: Subject to any disclaimer, the term of this patent is extended or adjusted under 35 U.S.C. 154(b) by 0 days.

(21) Appl. No.: 11/206,833

(22) Filed: Aug. 19, 2005

(65) Prior Publication Data

US 2006/0137491 A1 Jun. 29, 2006

(30) Foreign Application Priority Data

Dec. 28, 2004 (TW) .............................. 93140838 A

(51) Int. Cl.

| | |
|---|---|
| ***B25B 13/00*** | (2006.01) |
| ***B25B 23/16*** | (2006.01) |
| ***B25G 1/02*** | (2006.01) |
| ***B25G 1/00*** | (2006.01) |
| ***F16C 11/00*** | (2006.01) |
| ***F16C 1/12*** | (2006.01) |
| ***F16C 3/00*** | (2006.01) |

(52) U.S. Cl. .......................... 81/58; 81/58.3; 81/177.6; 81/177.7; 403/92; 403/97

(58) Field of Classification Search .................... 81/58, 81/58.3, 28.5, 177.7, 177.8, 177.6; 403/96, 403/97, 92

See application file for complete search history.

(56) References Cited

U.S. PATENT DOCUMENTS

| | | | | |
|---|---|---|---|---|
| 3,283,622 A * | 11/1966 | Wilson | ....................... | 81/58.3 |
| 4,530,262 A * | 7/1985 | Pownall | ..................... | 81/177.9 |
| 5,168,601 A * | 12/1992 | Liu | ............................. | 16/445 |
| 5,492,040 A * | 2/1996 | Bellas | ....................... | 81/125.1 |
| 5,943,925 A * | 8/1999 | Huang | ....................... | 81/177.2 |
| 6,186,033 B1 * | 2/2001 | Faro, Sr. | .................... | 81/177.7 |
| 6,401,576 B1 * | 6/2002 | Wu | ........................... | 81/177.4 |
| 6,895,839 B1 * | 5/2005 | Hsien | ........................ | 81/177.8 |
| 2003/0159549 A1 * | 8/2003 | Rocco | ....................... | 81/177.8 |
| 2004/0179891 A1 * | 9/2004 | Watkins et al. | ............... | 403/96 |

* cited by examiner

*Primary Examiner*—Joseph J. Hail, III
*Assistant Examiner*—Bryan R. Muller
(74) *Attorney, Agent, or Firm*—Rosenberg, Klein & Lee

(57) ABSTRACT

A ratchet wrench includes a head having an engaging portion for mounting an object and a through hole which includes an engaging inner periphery and a smooth inner periphery, and is closed by a bottom plate with a central hole. A movable member is movably received in the second through hole and includes a driving section and a connection section. An operation portion includes a handle and a mounting portion which has a connection recess so as to be engaged with the connection section of the movable member. The driving section of the movable member is removably engaged with the engaging inner periphery. By moving the movable member relative to the mounting portion, the handle can be selectively rotated freely or co-rotated with the head.

4 Claims, 6 Drawing Sheets

CONTROL DEVICE FOR RATCHET WRENCH

FIELD OF THE INVENTION

The present invention relates to a control device for a ratchet wrench and the control device includes less number of parts and is easily to be assembled.

BACKGROUND OF THE INVENTION

A conventional ratchet wrench generally includes a head with a driving member rotatably received in a through hole in the head and a handle integrally extends from an end of the head. A control device or a ratchet mechanism is received in a recess defined in an inner periphery of the through hole of the head and includes a pawl, a biasing unit for biasing the pawl and a control bar which is connected to the pawl so as to control the position of the pawl. The pawl can be engaged with toothed outer periphery of the driving member so as to output torque to an object mounted to the driving member, or can be disengaged from the driving member so that the handle can be freely rotated to a desired angle and ready for next rotational movement of the handle. This control device allows the user to reciprocally rotate the object without removing the wrench from the object. However, the parts of the control device are so small so that it is difficult to assemble all the parts in a small recess in the head. Besides, it is difficult to make the recess in a limited area of the head and the manufacturing cost will be high.

The present invention intends to provide a ratchet wrench wherein the control device is easily to be assembled to the head of the wrench.

SUMMARY OF THE INVENTION

The present invention relates to a ratchet wrench which comprises a head having an engaging portion with a polygonal inner periphery so as to be engaged with an object, and a second through hole which includes an engaging inner periphery and a smooth inner periphery. A bottom plate with a central hole is engaged with the smooth inner periphery. A movable member is movably received in the second through hole and includes a driving section and a connection section extending radially from the movable member. An operation portion includes a handle and a mounting portion which has a connection recess defined in an underside of the mounting portion and a top hole communicates with the connection recess. The connection section of the movable member is removably engaged with the connection recess and the driving section of the movable member is removably engaged with the engaging inner periphery.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 5 is pushed downward.

DETAILED DESCRIPTION OF THE PREFERRED EMBODIMENT

Figure 1:
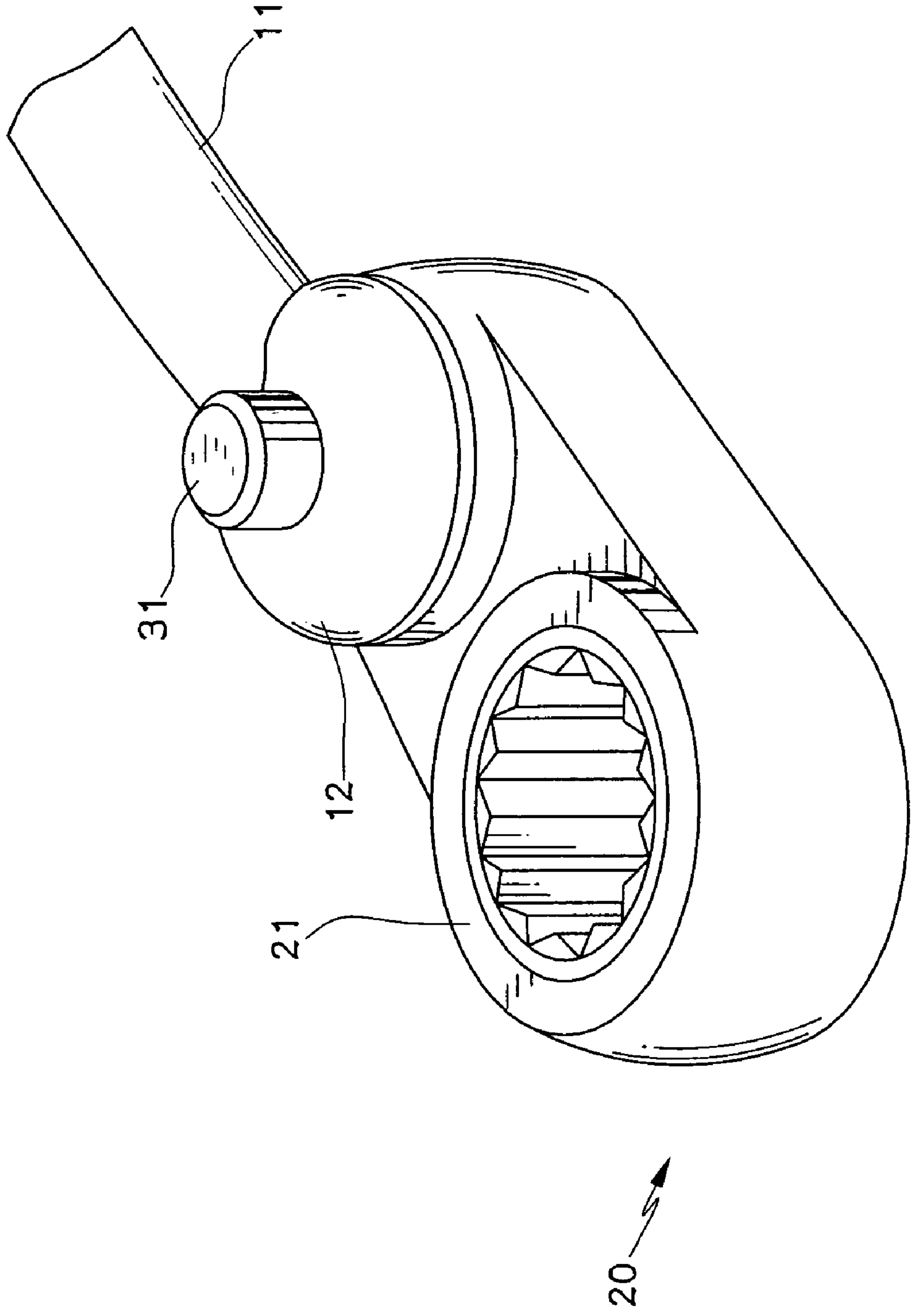
FIG. 1 is a perspective view to show the ratchet wrench of the present invention.
Figure 2:
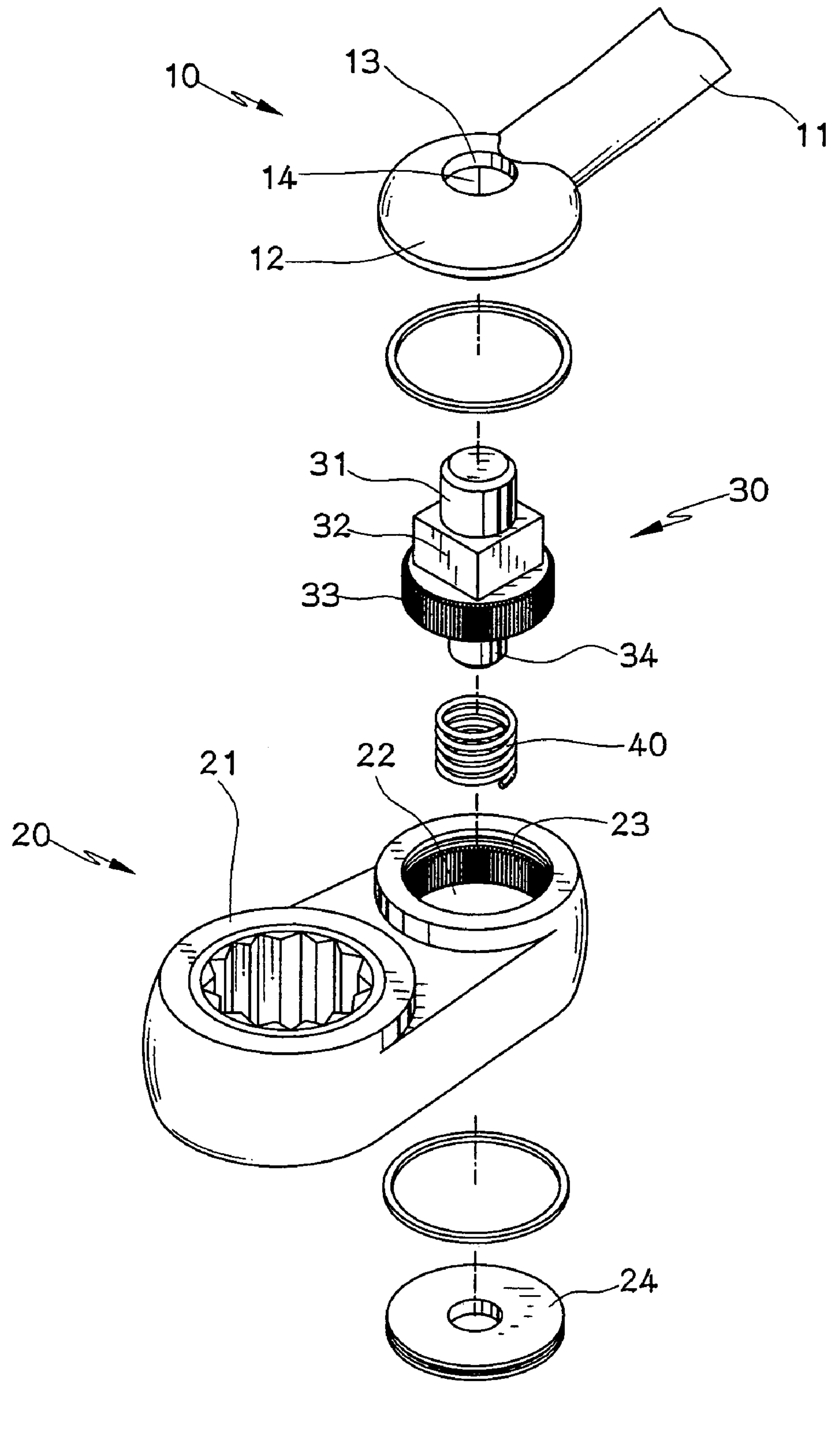
FIG. 2 is an exploded view to show the ratchet wrench of the present invention.

Referring to FIGS. 1 to 4, the ratchet wrench of the present invention comprises a head 20 having an engaging portion 21 which includes a first through hole with a polygonal inner periphery so as to be engaged with an object (not shown) and a second through hole which includes an engaging inner periphery 23 and a smooth inner periphery 22. A bottom plate 24 with a central hole is engaged with the smooth inner periphery 22. The engaging inner periphery 23 of the head 20 has a toothed inner periphery. The engaging inner periphery 23 of the head 20 can also be a polygonal inner periphery.

A movable member 30 is movably received in the second through hole and includes a top protrusion 31 and a bottom protrusion 34 extending from two opposite ends of the movable member 30. A driving section 33 and a connection section 32 extend radially from the movable member 30 and are located between the top and bottom protrusions 31, 34. The driving section 33 includes a toothed outer periphery which can be engaged with the toothed inner periphery of the engaging inner periphery 23 of the head 20. Of course, the driving section 33 can also be a polygonal outer periphery.

Figure 3:
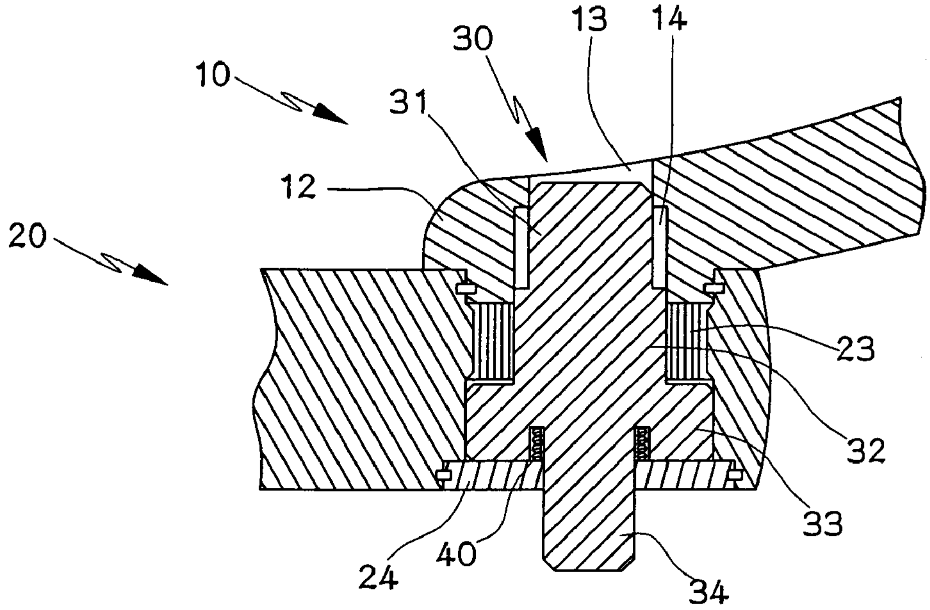
FIG. 3 is a cross sectional view to show when the movable member of the control device of the present invention is lowered.

An operation portion 10 includes a handle 11 and a mounting portion 12. The mounting portion 12 has a connection recess 14 which is defined in an underside of the mounting portion 12 and a top hole 13 which communicates with the connection recess 14. The top protrusion 31 movably extends through the top hole 13 and the bottom protrusion 34 movably extends through the central hole of the bottom plate 24. The connection section 32 of the movable member 30 is a rectangular section which is engaged with the connection recess 14 so that the movable member 30 is co-rotated with the handle 11. It is noted that the height of the driving section 33 is shorter than that of the smooth inner periphery 22 of the second through hole of the head 20 so that when the movable member 30 is moved toward the bottom plate 24, the driving section 33 is completely disengaged from the engaging inner periphery 23 of the head 20 such that the movable member 30 is freely rotated in the second through hole as shown in FIG. 3. The height of the connection section 32 is longer than that of the connection recess 14 of the mounting portion 12 so that when the movable member 30 is moved away from the bottom plate 24 and the driving section 33 is completely disengaged from the engaging inner periphery 23 of the head 20, a part of the connection section 32 is engaged with the connection recess 14 such that the movable member 30 is co-rotated with the handle 11 as shown in FIG. 4.

Figure 4:
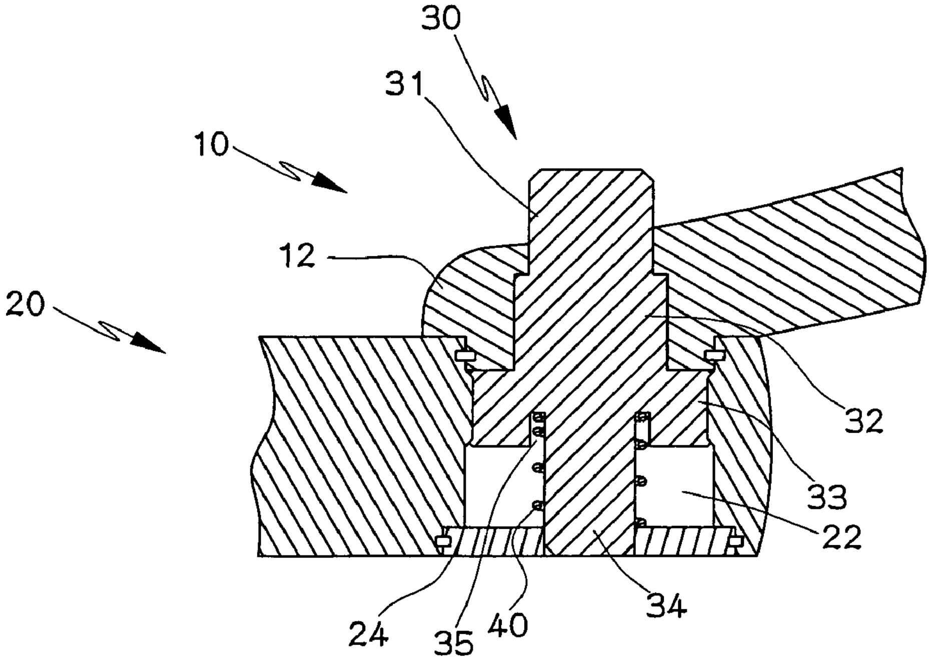
FIG. 4 is a cross sectional view to show when the movable member of the control device of the present invention is pushed upward.

A spring 40 is mounted to the bottom protrusion 34 and biased between an underside of the driving section 33 and the bottom plate 24, so that the spring 40 normally pushes the movable member 30 at upper position as disclosed in FIG. 4.

When in the status in FIG. 3, the handle 11 is freely rotated relative to the head 20 and the movable member 30 is co-rotated with the handle 11. On the contrary, when the movable member 30 is in the status in FIG. 4, the rotation of the handle 11 rotates the head 20 so as to tighten or loosen the object.

Figure 5:
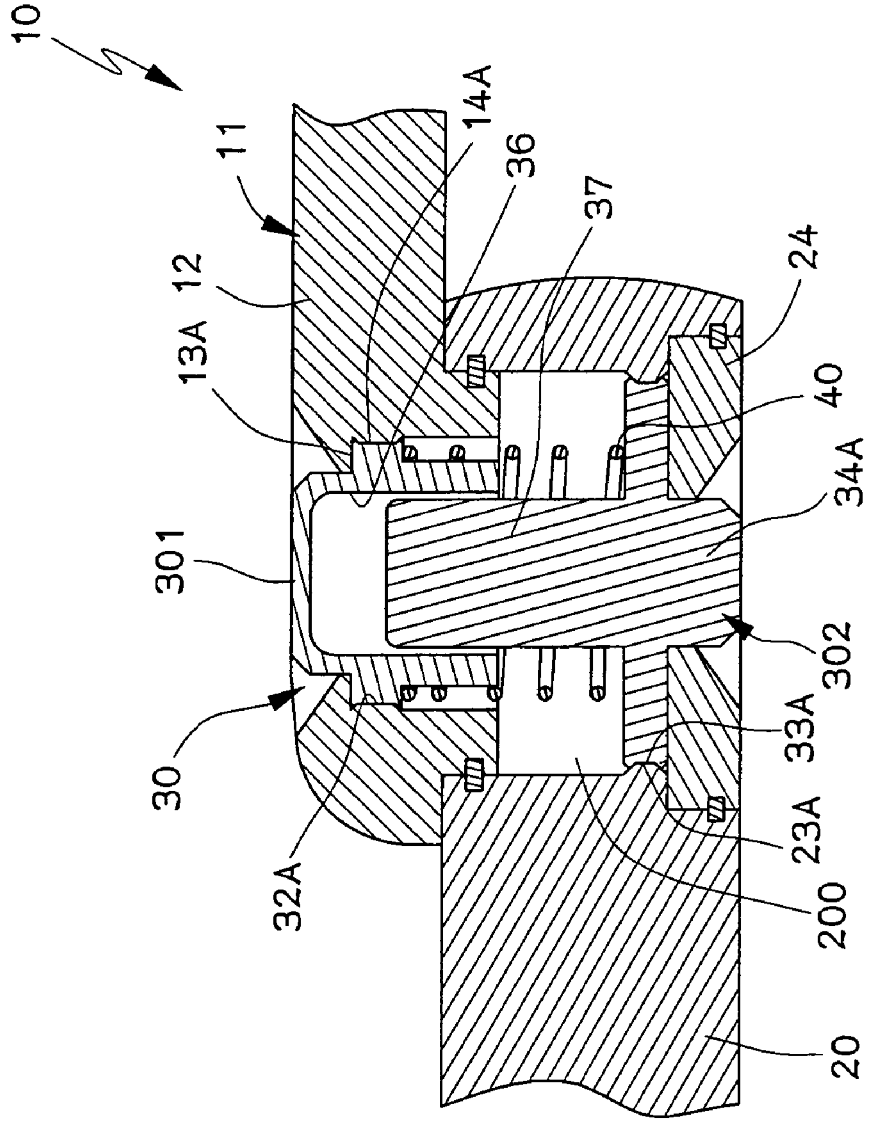
FIG. 5 is a cross sectional view to show another embodiment of the control device of the present invention.
Figure 6:
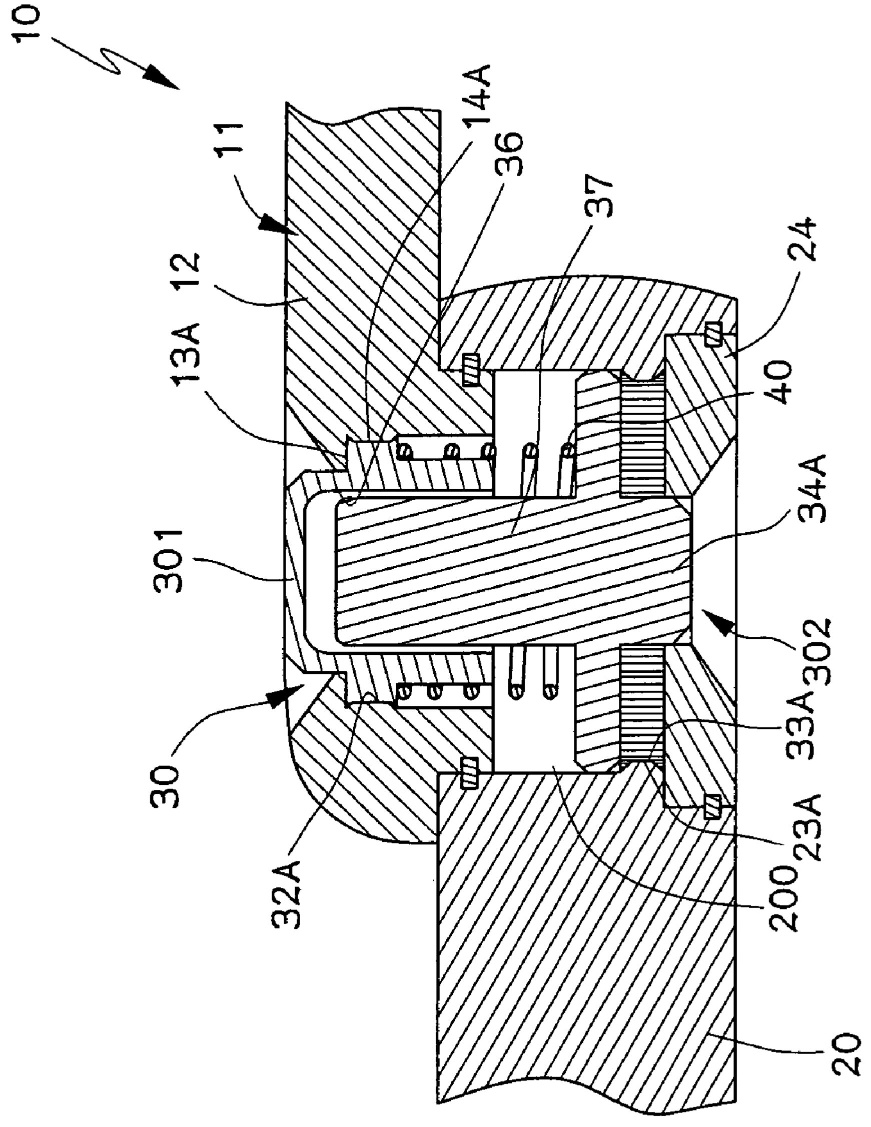
FIG. 6 is a cross sectional view to show the rod portion in FIG. 5 is pushed upward.
Figure 7:
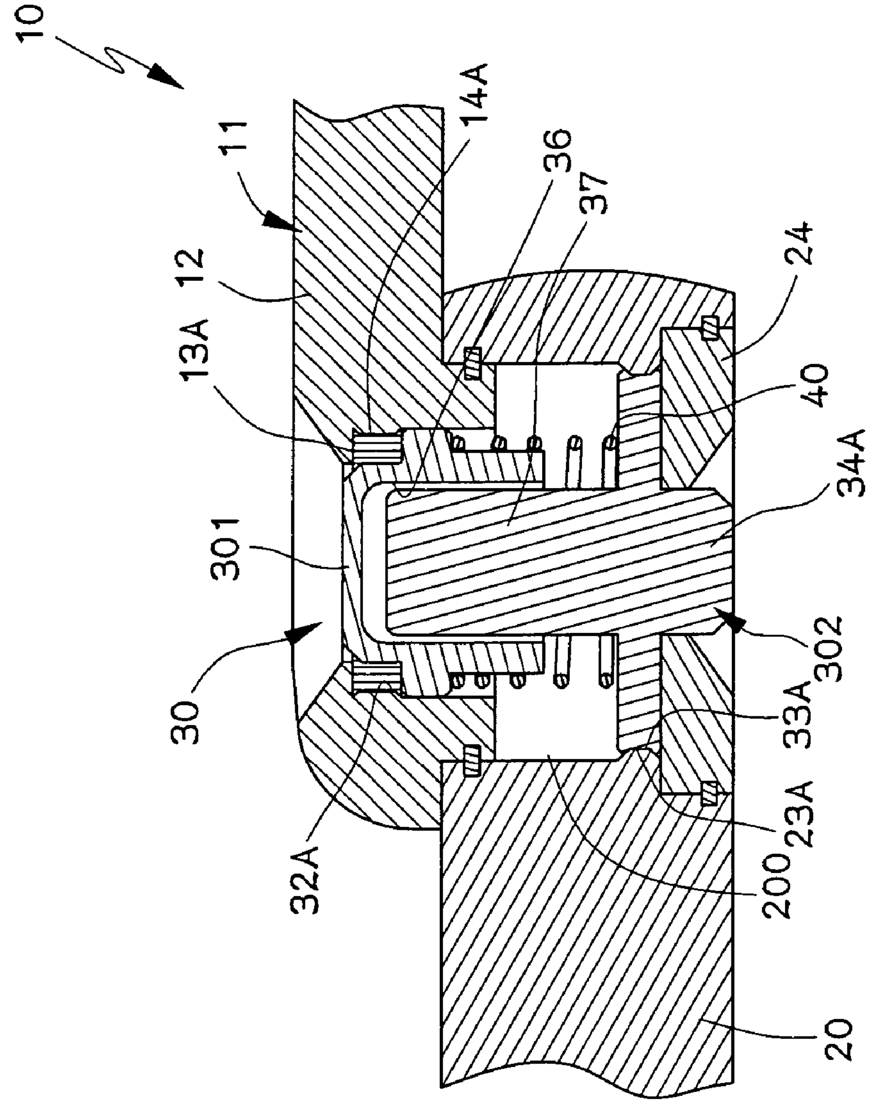
FIG. 7 is a cross sectional view to show the cap member

FIGS. 5-7 disclose another embodiment of the control device of the present invention wherein the ratchet wrench comprises a head 20 having an engaging portion 21 which includes a first through hole with a polygonal inner periphery to be engaged with an object and a second through hole 200 which includes a first engaging inner periphery 23A. A bottom plate 24 with a central hole is engaged with the second through hole.

A movable member 30 is movably engaged with the second through hole and composed of a cap member 301 and a rod portion 302. The rod portion 302 is movably received in the second through hole 220 and has a flange that has a first engaging outer periphery 33A which is removably engaged with the first engaging inner periphery 23A. The rod portion 302 includes a first end 37 and a second end 34A, wherein the second end 34A movably extends through the central hole of the bottom plate 24, wherein the central hole is a sink hole and the second end 34A of the rod portion 302A is movably received in the sink hole and does not extend beyond an underside of the bottom plate 24. The cap member 301 has a polygonal recess 36 and the first end 37 of the rod portion 302 is movably engaged with the polygonal recess 36 so that the rod portion 302 is co-rotated with the cap member 301. The cap 301 has an annular lip which has a second engaging outer periphery 32A.

An operation portion 10 includes a handle 11 and a mounting portion 12. A connection recess 14 is defined in an underside of the mounting portion 12 and a top hole 13 which communicates with the connection recess 14. The top hole 13 is a sink hole and includes an inward flange 13A so as to stop the annular lip of the cap member 301 to prevent the cap member 301 from dropping out from the top hole 13. The connection recess 14 has a second engaging inner periphery 14A and the second engaging outer periphery 32A of the cap member 301 is removably engaged with the second engaging inner periphery 14A. A spring 40 is mounted to the rod portion 302A and biased between the annular lip of the cap member 301 and a top surface of the flange of the rod portion 302A.

When rotating the handle 11 in the status as in FIG. 5, the handle 11 rotates the cap member 301 which drives the rod portion 302 and the rod portion 302 rotates the head 20. When rotating the handle in the status as in FIG. 6, because the rod portion 302 is lifted and the first engaging outer periphery 33A is disengaged from the first engaging inner periphery 23A, so that the rod portion 302 is freely rotated relative to the head 20. If the cap member 301 is pushed toward the rod portion 302, the second engaging outer periphery 32A is disengaged from the second engaging inner periphery 14A, the handle 11 is freely rotated relative to the cap member 301 so that the head 20 can be maintained still.

While we have shown and described the embodiment in accordance with the present invention, it should be clear to those skilled in the art that further embodiments may be made without departing from the scope of the present invention.

What is claimed is:

1. A ratchet wrench comprising:

a head having an engaging portion which includes a first through hole with a polygonal inner periphery which is adapted to be engaged with an object and a second through hole which includes an engaging inner periphery and a smooth inner periphery, a bottom plate with a central hole engaged with the smooth inner periphery;

a movable member movably received in the second through hole, a top protrusion and a bottom protrusion extending from two opposite ends of the movable member, a driving section and a connection section extending radially from the movable member and located between the top and bottom protrusions, and an operation portion including a handle and a mounting portion, a connection recess defined in an underside of the mounting portion and a top hole which communicates with the connection recess, the top protrusion movably extending through the top hole and the bottom protrusion extending through the central hole of the bottom plate, wherein a spring is mounted to the bottom protrusion and biased between an underside of the driving section and the bottom plate, the connection section of the movable member removably engaged with the connection recess and the driving section of the movable member removably engaged with the engaging inner periphery, a height of the connection section is longer than that of the connection recess of the mounting portion so that when the movable member is moved away from the bottom plate, the driving section is completely disengaged from the engaging inner periphery of the head and a part of the connection section is engaged with the connection recess such that the movable member is co-rotated with the handle.

2. The ratchet as claimed in claim 1, wherein the connection section is a rectangular section which is engaged with the connection recess so that the movable member is co-rotated with the handle.

3. The ratchet as claimed in claim 1, wherein a height of the driving section is shorter than that of the smooth inner periphery of the second through hole of the head so that when the movable member is moved toward the bottom plate, the driving section is completely disengaged from the engaging inner periphery of the head such that the movable member is freely rotated in the second through hole.

4. The ratchet as claimed in claim 1, wherein the driving section includes a toothed outer periphery and the engaging inner periphery of the head has a toothed inner periphery.

* * * * *